(12) United States Patent
Perkins et al.

(10) Patent No.: US 7,204,127 B2
(45) Date of Patent: Apr. 17, 2007

(54) METHOD AND APPARATUS FOR LARGE LEAK TESTING

(75) Inventors: Charles Perkins, Boston, MA (US); Pieter N. Palenstijn, Plympton, MA (US)

(73) Assignee: Varian, Inc., Palo Alto, CA (US)

( * ) Notice: Subject to any disclaimer, the term of this patent is extended or adjusted under 35 U.S.C. 154(b) by 3 days.

(21) Appl. No.: 10/524,284

(22) PCT Filed: Jun. 10, 2004

(86) PCT No.: PCT/US2004/018615

§ 371 (c)(1),
(2), (4) Date: Feb. 10, 2005

(87) PCT Pub. No.: WO2004/111549

PCT Pub. Date: Dec. 23, 2004

(65) Prior Publication Data

US 2005/0199042 A1    Sep. 15, 2005

(51) Int. Cl.
*G01M 3/20* (2006.01)

(52) U.S. Cl. .......................................... 73/40.7; 73/40

(58) Field of Classification Search .................. 73/40, 73/40.7, 49.2, 49.3
See application file for complete search history.

(56) References Cited

U.S. PATENT DOCUMENTS

| | | | | |
|---|---|---|---|---|
| 3,520,176 A | | 7/1970 | Becker ....................... 73/40.7 |
| 3,591,827 A | * | 7/1971 | Hall ........................... 315/108 |
| 3,690,151 A | * | 9/1972 | Briggs ........................ 73/40.7 |
| 4,773,256 A | | 9/1988 | Saulgeot ..................... 73/40.7 |
| 4,779,449 A | * | 10/1988 | Bley et al. .................. 73/40.7 |
| 5,193,380 A | * | 3/1993 | Tallon ........................ 73/40.7 |
| 5,625,141 A | * | 4/1997 | Mahoney et al. ............ 73/40.7 |
| 5,661,229 A | | 8/1997 | Bohm et al. ................. 73/40.7 |
| 5,728,929 A | | 3/1998 | Gevaud ..................... 73/19.12 |
| 6,014,892 A | | 1/2000 | Baret et al. ................. 73/40.7 |

* cited by examiner

*Primary Examiner*—Daniel S. Larkin
(74) *Attorney, Agent, or Firm*—Bella Fishman (57) ABSTRACT

Methods and apparatus for large leak testing are provided. The apparatus includes a test line to receive a sample containing a trace gas, a mass spectrometer to detect the trace gas and having an inlet for receiving the trace gas, a first vacuum pump characterized by a relatively high reverse flow rate for light gases and a relatively low reverse flow rate for heavy gases, the first vacuum pump having a pump inlet and a foreline, the pump inlet being coupled to the inlet of the mass spectrometer, and a second vacuum pump configured to back the first vacuum pump. The apparatus further includes a trace gas permeable member coupled between the test line and the pump inlet, the foreline, or, in the case where the first vacuum pump is a turbomolecular pump, a midstage line.

18 Claims, 8 Drawing Sheets

METHOD AND APPARATUS FOR LARGE LEAK TESTING

FIELD OF THE INVENTION

This invention relates to detection of leaks in articles and, more particularly, to methods and apparatus for helium leak detection over a large range of leak rates, including large leaks.

BACKGROUND OF THE INVENTION

Helium mass spectrometer leak detection is a well-known leak detection technique. Helium is used as a tracer gas which passes through the smallest of leaks in a sealed test piece. After passing through a leak, a test sample containing helium is drawn into a leak detection instrument and is measured. An important component of the instrument is a mass spectrometer tube which detects and measures the helium. The input test sample is ionized and mass analyzed by the spectrometer tube in order to separate the helium component. In one approach, a test piece is pressurized with helium. A sniffer probe connected to the test port of the leak detector is moved around the exterior of the test piece. Helium passes through leaks in the test piece, is drawn into the probe and is measured by the leak detector. In another approach, the interior of the test piece is coupled to the test port of the leak detector and is evacuated. Helium is sprayed onto the exterior of the test piece, is drawn inside through a leak and is measured by the leak detector.

One of the difficulties associated with helium mass spectrometer leak detection is that the inlet of the mass spectrometer tube must be maintained at a relatively low pressure, typically $2\times10^{-4}$ Torr. In a so-called conventional leak detector, the test port, which is connected to the test piece or to the sniffer probe, must be maintained at relatively low pressure. Thus, the vacuum pumping cycle is relatively long. Furthermore, in the testing of leaky or large volume parts, it may be difficult or impossible to reach the required pressure level. If the required pressure level can be reached, the pumping cycle is lengthy.

Techniques have been proposed in the prior art to overcome this difficulty. A counterflow leak detector disclosed in U.S. Pat. No. 3,690,151, issued Sep. 12, 1972 to Briggs, utilizes a technique of reverse flow of helium through a diffusion pump to the mass spectrometer. The leak detector test port can be operated at the pressure of the diffusion pump foreline. A similar approach utilizes reverse flow of helium through a turbomolecular pump. A technique for gross leak detection is disclosed in U.S. Pat. No. 4,735,084 issued Apr. 5, 1988 to Fruzzetti. The tracer gas is passed in reverse direction through one or two stages of a mechanical vacuum pump. These techniques have permitted the test port pressure to be higher than for conventional leak detectors. Nonetheless, reaching the higher test port pressure can be difficult when testing large volumes, dirty parts or parts with large leaks.

Figure 1:
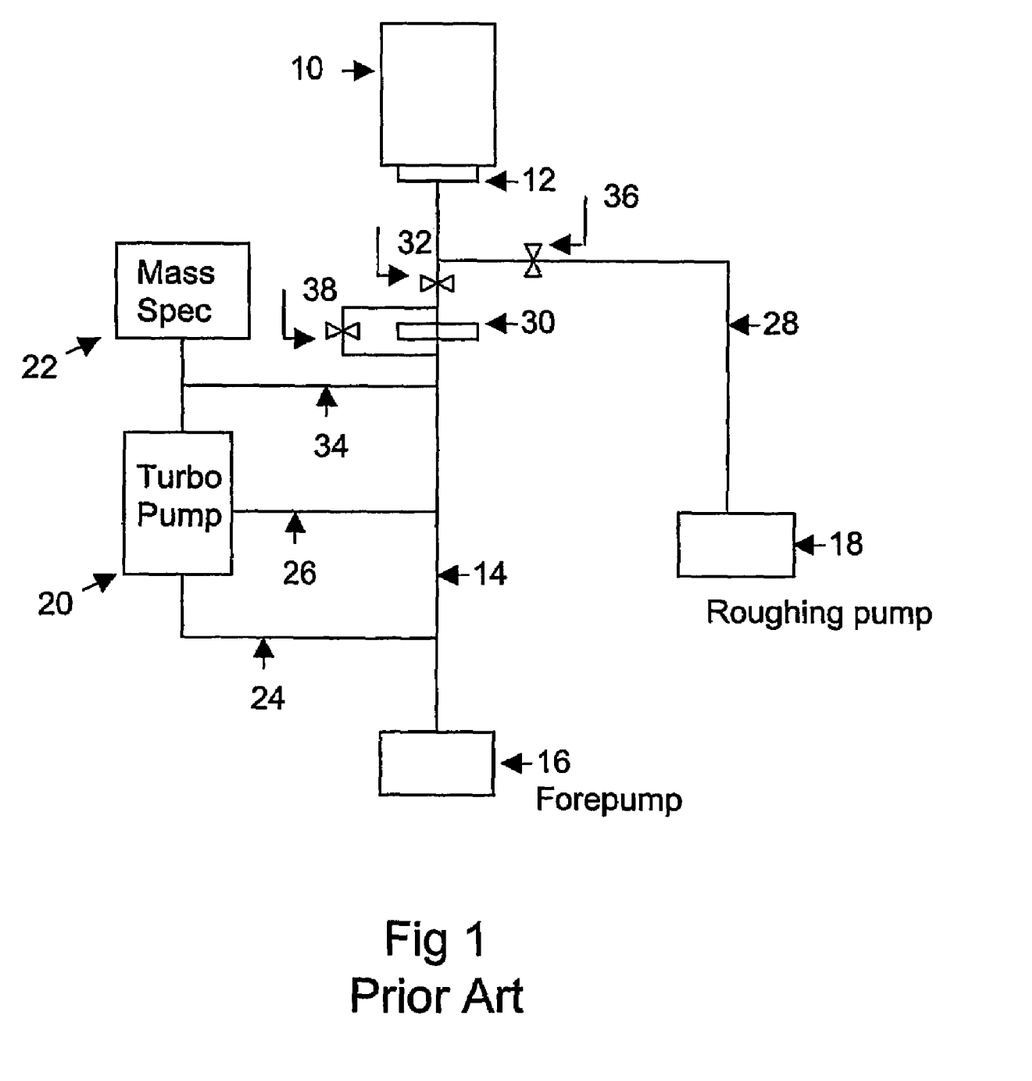
FIG. 1 is a block diagram of a prior art dual pump leak detector for large leak testing.

A simplified schematic diagram of a prior art leak detector for large leak testing is shown in FIG. 1. A test piece 10 is attached to an inlet flange 12. Inlet flange 12 defines a test port of the leak detector and is connected through a test valve 32 and a differential pressure aperture 30 to a test line 14. The leak detector includes a forepump 16, a roughing pump 18, a turbomolecular pump (turbopump) 20 and a mass spectrometer 22. A foreline 24 of turbopump 20 is connected to test line 14, and mass spectrometer 22 is connected to the inlet of turbopump 20. A midstage line 26 of turbopump 20 may be connected to test line 14. Forepump 16 rough pumps test line 14 and test piece 10 from ambient pressure and also backs turbopump 20. Helium that enters the test port from test piece 10 flows in contraflow or reverse direction through turbopump 20 and into mass spectrometer 22. The mass spectrometer detects the helium and indicates a helium leak rate. An alternate prior art non-contraflow configuration uses a direct connection 34 between test line 14 and the inlet of mass spectrometer 22.

For large leak testing, where the test port pressure may be greater than the allowable foreline pressure of the turbopump 20, roughing pump 18 is utilized in prior art leak detectors with a roughing line 28 and a roughing valve 36. Aperture 30 operates such that most of the gas flows to roughing pump 18 while a fraction of the gas flows to the forepump 16, with helium passing in reverse direction through mass spectrometer 22. A bypass valve 38 is used to bypass aperture 30. Testing with two pumps and a differential pressure aperture is inherently unreliable since, for example, the aperture can become partially plugged by contamination, resulting in erroneous readings. Furthermore, the cost of the roughing pump and associated hardware significantly increases cost.

European Patent Application No. 0 352 371 published Jan. 31, 1990 discloses a helium leak detector including an ion pump connected to a probe in the form of a silica glass capillary tube. The silica glass tube is heated to a temperature between 300° C. and 900° C. and thereby becomes permeable to helium. U.S. Pat. No. 5,325,708 issued Jul. 5, 1994 to De Simon discloses a helium detecting unit using a quartz capillary membrane, a filament for heating the membrane and an ion pump. U.S. Pat. No. 5,661,229 issued Aug. 26, 1997 to Bohm et al. discloses a leak detector with a polymer or heated quartz window for selectively passing helium to a gas-consuming vacuum gauge.

All of the prior art helium leak detectors have had one or more drawbacks, including limited pressure ranges, susceptibility to contaminants and/or high cost. Accordingly, there is a need for improved methods and apparatus for leak detection.

SUMMARY OF THE INVENTION

According to a first aspect of the invention, apparatus for leak detection is provided. The apparatus comprises a test line configured to receive a sample containing a trace gas, a mass spectrometer configured to detect the trace gas and having an inlet for receiving the trace gas, a first vacuum pump characterized by a relatively high reverse flow rate for light gases and a relatively low reverse flow rate for heavy gases, the first vacuum pump having a pump inlet and a foreline, the pump inlet being coupled to the inlet of the mass spectrometer, and a foreline valve coupled between the foreline of the first vacuum pump and the test line. The apparatus further comprises a trace gas permeable member coupled between the test line and the inlet of the mass spectrometer, and a second vacuum pump having an inlet coupled to the test line.

The permeable member may be permeable to helium, and the trace gas permeability of the permeable member may be controllable. In some embodiments, the permeable member comprises a quartz member. The apparatus may further comprise a heating element in thermal contact with the quartz member and a controller configured to control the heating element. In other embodiments, the permeable member comprises a polymer member.

The apparatus may further include a controller configured to increase the permeability of the permeable member and to close the foreline valve at relatively high pressures in the test line and configured to decrease the permeability of the permeable member and to open the foreline valve at relatively low pressures in the test line.

According to a second aspect of the invention, a method for leak detection is provided. The method comprises pumping gas from a test volume through a test line, at relatively high pressures in the test line, passing a first portion of the pumped gas through a trace gas permeable member to a mass spectrometer, and, at relatively low pressures in the test line, passing a second portion of the pump gas in reverse direction through a vacuum pump to the mass spectrometer. The vacuum pump is characterized by a relatively high reverse flow rate for light gases and a relatively low reverse flow rate for heavy gases.

According to a third aspect of the invention, apparatus for leak detection is provided. The apparatus comprises a test line configured to receive a sample containing a trace gas; a mass spectrometer configured to detect the trace gas and having an inlet for receiving the trace gas; a first vacuum pump characterized by a relatively high reverse flow rate for light gases and a relatively low reverse flow rate for heavy gases, the first vacuum pump having a pump inlet and a foreline, the pump inlet being coupled to the inlet of the mass spectrometer; a second vacuum pump configured to back the first vacuum pump; and a trace gas permeable member coupled between the test line and at least one of the pump inlet and the foreline.

According to a fourth aspect of the invention, apparatus for leak detection is provided. The apparatus comprises a test line configured to receive a sample containing a trace gas; a mass spectrometer configured to detect the trace gas and having an inlet for receiving the trace gas; a turbomolecular vacuum pump having a pump inlet, a midstage line and a foreline, the pump inlet being coupled to the inlet of the mass spectrometer; a forepump configured to back the turbomolecular vacuum pump; and a trace gas permeable member coupled between the test line and the midstage line of the turbomolecular vacuum pump.

BRIEF DESCRIPTION OF THE DRAWINGS

For a better understanding of the present invention, reference is made to the accompanying drawings, which are incorporated herein by reference and in which.

DETAILED DESCRIPTION OF THE INVENTION

Figure 2:
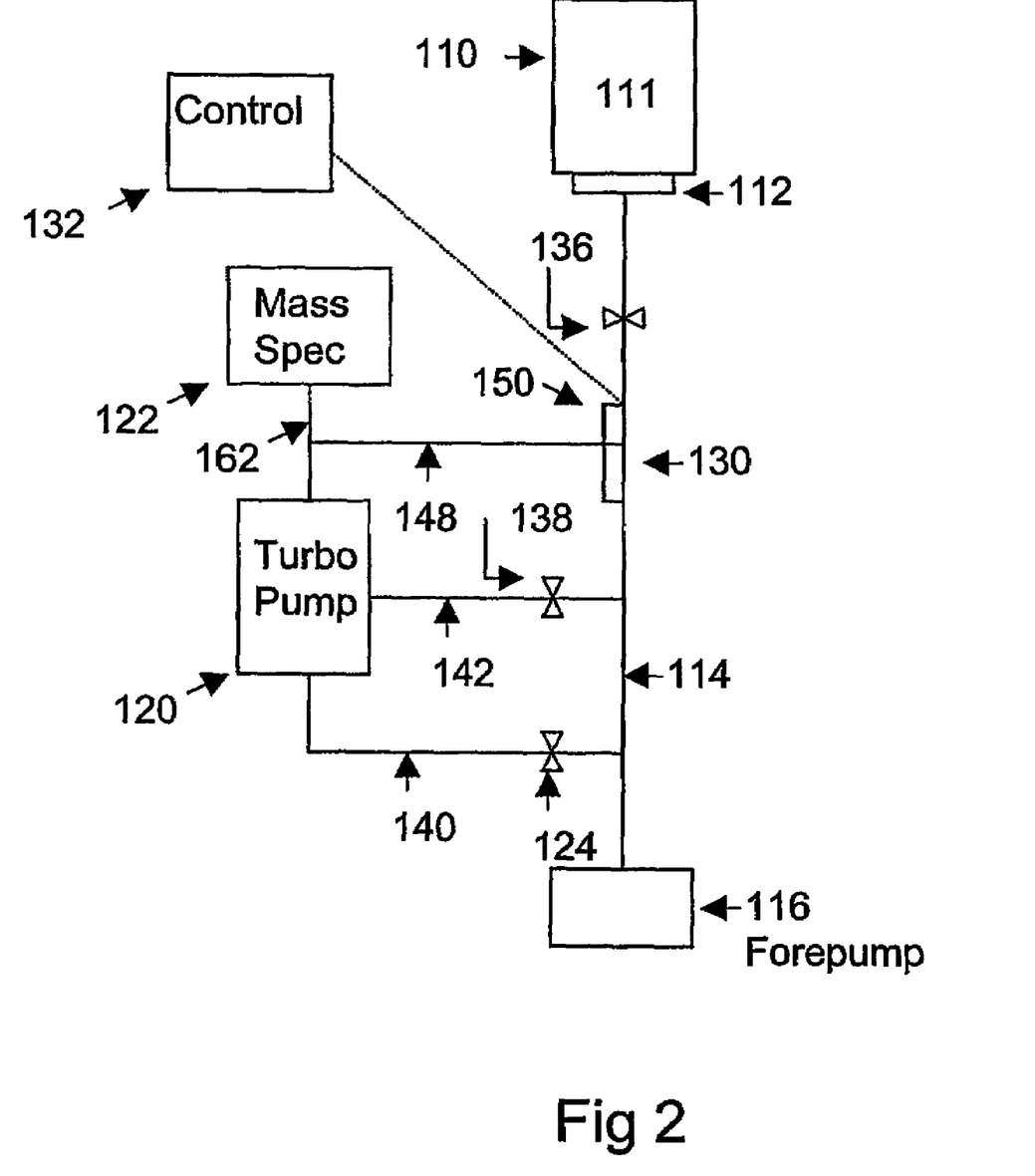
FIG. 2 is a simplified block diagram of apparatus for leak detection in accordance with a first embodiment of the invention.

Apparatus for leak detection in accordance with a first embodiment of the invention is shown in FIG. 2. A test piece 110 having a test volume 111 is attached to an inlet flange 112. Inlet flange 112 defines a test port of a leak detector and is connected through a test valve 136 to a test line 114. A forepump 116 has an inlet coupled to test line 114 for pumping of test line 114 and test volume 111. The teak detector further includes a turbopump 120, a mass spectrometer 122, a foreline valve 124, a midstage valve 138, a trace gas permeable member 130, a controller 132 and associated conduits. Mass spectrometer 122 has an inlet 162 coupled to an inlet of turbopump 120. A foreline 140 of turbopump 120 is coupled through foreline valve 124 to test line 114. An optional midstage line 142 of turbopump 120 is coupled through midstage valve 138 to test line 114.

Turbopump 120 may be replaced with a diffusion pump, a so-called hybrid turbopump or a molecular drag pump. A midstage connection is not utilized on a diffusion pump. In a hybrid turbopump, one or more of the axial pumping stages are replaced with disks which rotate at high speed and function as molecular drag stages. This configuration is disclosed in U.S. Pat. No. 5,238,362 issued Aug. 24, 1993 to Casaro et al. In each case, the vacuum pump is characterized by a relatively high reverse flow rate for light gases, such as helium, and a relatively low reverse flow rate for heavy gases, so that helium passes through the vacuum pump in a reverse direction from foreline 140 to mass spectrometer 122 and other gases are substantially blocked.

Trace gas permeable member 130 is coupled through a conduit 148 between test line 114 and the inlet 162 of mass spectrometer 122. Permeable member 130 is a material that is permeable to the trace gas used in the leak detector, typically helium, under specified conditions. Permeable member 130 substantially passes, or permeates, the trace gas while substantially blocking other gases, liquids and particles. The permeable member 130 thus acts as a trace gas window in the sense of allowing the trace gas to pass while blocking other gases, liquids and particles.

Figure 2A:
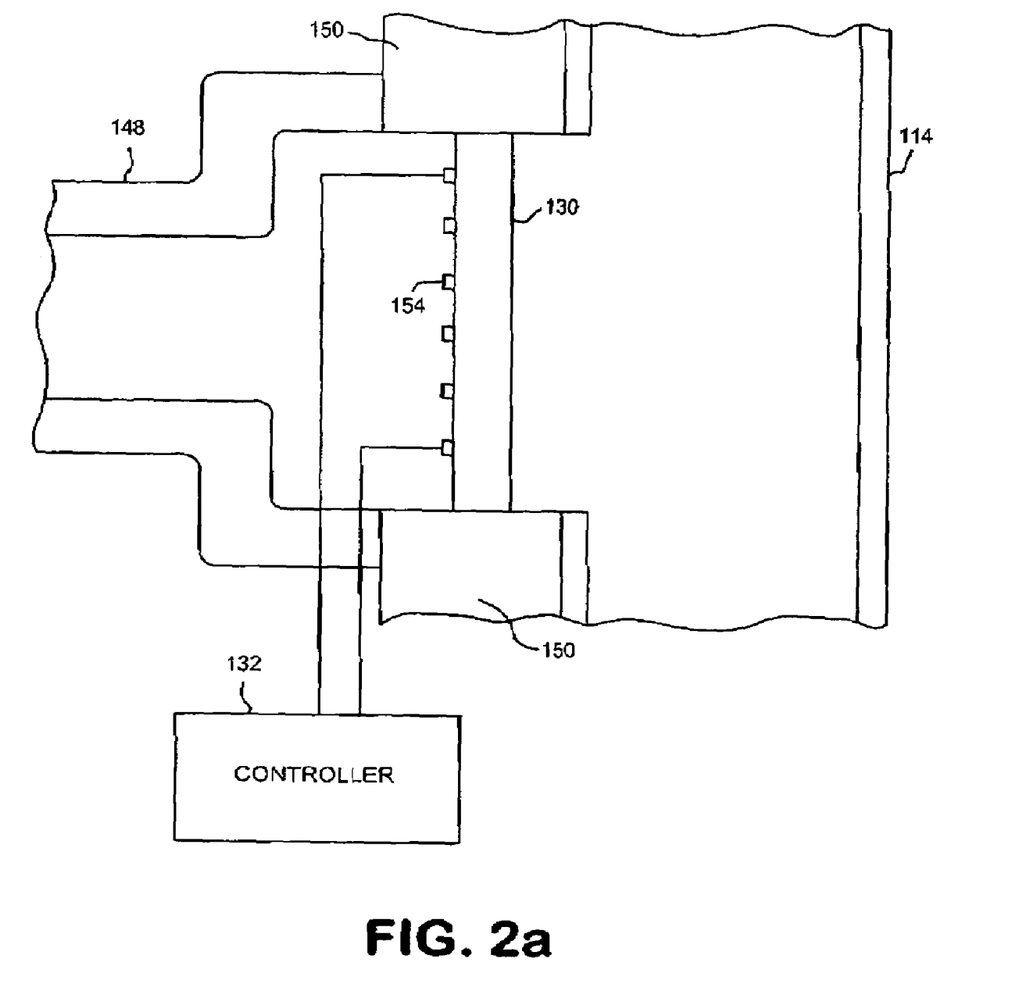
FIG. 2A is a simplified partial cross-sectional diagram of the apparatus of FIG. 2, showing the permeable member.

As shown in FIG. 2A, permeable member 130 may be sealed in a fixture 150 connected to conduit 148 such that gas passing through conduit 148 to mass spectrometer 122 passes through permeable member 130. Permeable member 130 may have the shape of a disk, for example.

Quartz, or silica glass, is an example of a material that is permeable to helium. In particular, the helium permeability of quartz varies with temperature, at elevated temperatures in the range of 300° C. to 900° C., quartz has a relatively high helium permeability. At room temperature, quartz has a relatively low helium permeability. As further shown in FIG. 2a, the leak detector may be provided with a heating element 154 in thermal contact with quartz permeable member 130. Heating element 154 may be energized by controller 132 to increase the helium permeability of quartz permeable member 130. By controlling the temperature of permeable member 130, a helium window is provided. At a relatively high temperature (e.g. 300° C. to 900° C.), helium permeability is high and the helium window is open. At a relatively low temperature (e.g. room temperature), helium permeability is low and the helium window is closed. Other suitable trace gas permeable member materials include polymers, such as tetrafluoroethylene, known under the trade name TEFLON®.

Figure 3:
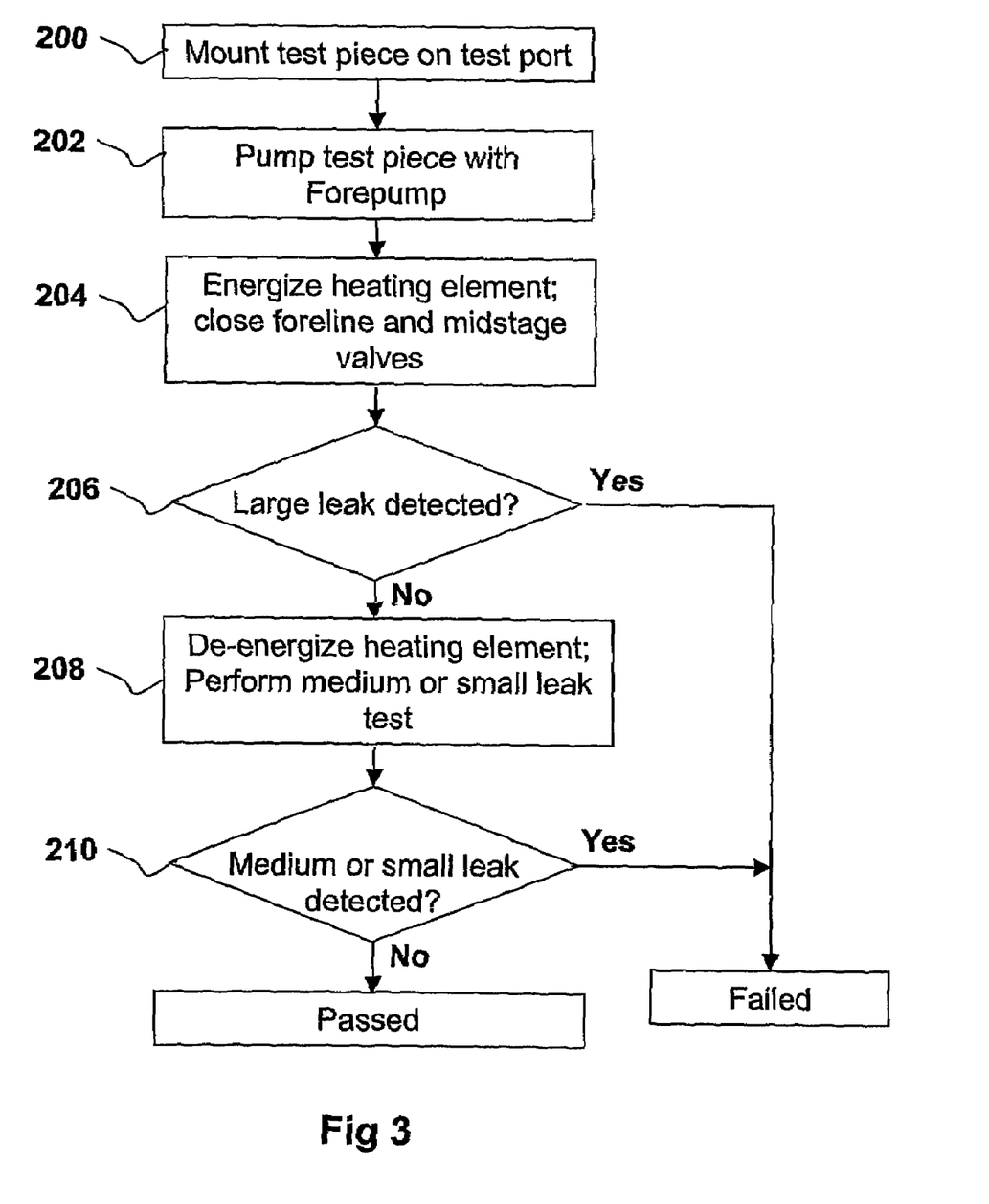
FIG. 3 is a simplified flow chart of a method for leak detection in the apparatus of FIG. 2.

Operation of the leak detector shown in FIG. 2 is described with reference to the flow chart of FIG. 3. In step 200, test piece 110 (FIG. 2) is mounted on the test port of the leak detector. More particularly, test piece 110 is mounted on inlet flange 112. In step 202, test valve 136 is opened and test piece 110 is pumped with forepump 116, typically beginning from atmospheric pressure. In step 204, the heating element 154 is energized, and foreline valve 124 and midstage valve 138 are closed. This effectively blocks helium from reaching mass spectrometer 122 through turbopump 120 and increases the helium permeability of permeable member 130. Thus, helium can flow from test line 114 through permeable member 130 to mass spectrometer 122. The permeable member 130 prevents other gases and contaminants from entering the mass spectrometer 122. Thus, leak testing can begin as soon as forepump 116 begins pumping the test volume. In prior art leak detectors, leak testing could not begin until a sufficiently low test line pressure was achieved for proper turbopump and mass spectrometer operation. This time advantage is important for many applications. If the pressure level in mass spectrometer 122 becomes too high, foreline valve 124 automatically opens and a test valve 136 closes for a brief time period to reconnect forepump 116 and re-establish the desired pressure level.

In step 206, a determination is made as to whether the test piece 110 has a large leak, based on the amount of helium received through permeable member 130. If a large leak is detected, the test piece 110 is classified as having failed the test, and the test is terminated.

If a large leak is not detected in step 206, the heating element 154 is de-energized in step 208 and the leak detector is configured for medium or small leak detection. Midstage valve 138 is opened for medium leak detection, and foreline valve 124 is opened for small leak detection. In some cases, midstage valve 138 and foreline valve 124 can both be opened. In this mode, helium in test line 114 passes through turbopump 120 in reverse direction from foreline 140 and/or midstage line 142 to mass spectrometer 122. This mode permits test line 114 to operate at the foreline pressure of turbopump 120. In step 210, a determination is made as to whether test piece 110 has a medium or small leak. The detection of a medium or small leak is based on the amount of helium that passes from test line 114 through turbopump 120 to mass spectrometer 122. If a medium or small leak is detected in step 210, the test piece is classified as having a leak and fails the leak test. If a leak is not detected in step 210, the test piece passes the leak test.

The permeable member 130 can be made of any suitable material that is permeable to the trace gas, typically helium, and may have any shape or dimension. Examples of suitable materials include quartz and permeable polymers. When quartz is utilized, a heating element heats the quartz material to increase helium permeability while selectively blocking most other gases, water vapor and particles. The quartz has a constant permeability for a given temperature. The temperature can be adjusted to control the permeability and therefore the sensitivity. A heating element is not required in the case of a permeable polymer. The permeable member can be mounted at the inlet of the mass spectrometer. The helium which permeates through the permeable member is detected by the mass spectrometer, and the signal is converted to a leak measurement. The permeable member can operate at vacuum, at atmospheric pressure or at a pressure slightly higher than atmospheric pressure. The permeable member can operate in an atmosphere that contains gases, particles and in wet environments. The permeable member permits large leak detection in a helium leak detector with a single backing pump.

Figure 4:
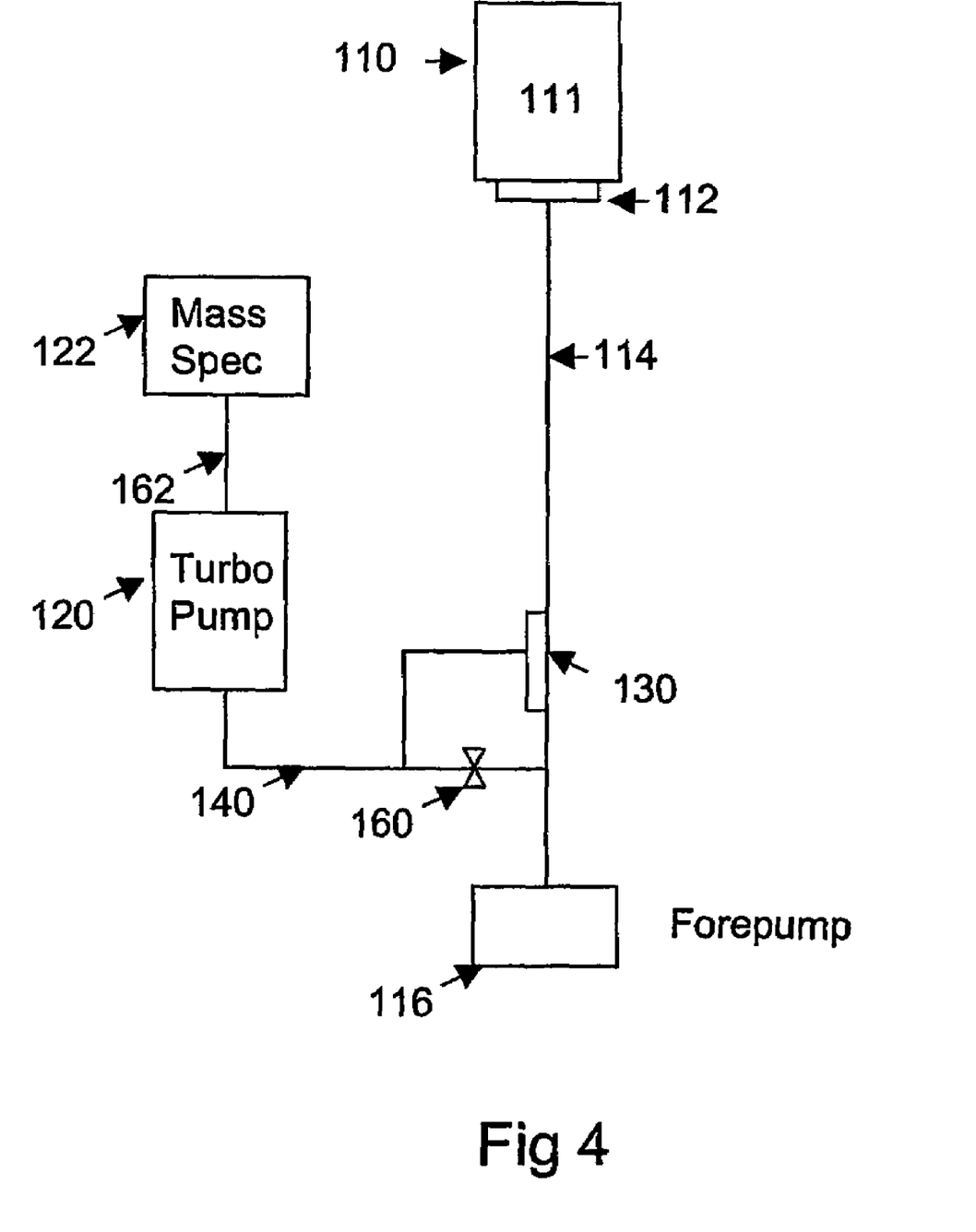
FIG. 4 is a simplified block diagram of apparatus for leak detection in accordance with a second embodiment of the invention.

Apparatus for leak detection in accordance with a second embodiment of the invention is shown in FIG. 4. Like elements in FIGS. 2 and 4 have the same reference numerals. In the embodiment of FIG. 4, trace gas permeable member 130 is coupled between test line 114 and foreline 140 of turbopump 120. A bypass valve 160 is coupled between foreline 140 and test line 114. Permeable member 130 is bypassed when valve 160 is open. In operation, helium in test line 114 passes through permeable member 130 to the foreline 140 of turbopump 120. The helium then passes in reverse direction through turbopump 120 to inlet 162 of mass spectrometer 122 and is measured by mass spectrometer 122. In other embodiments, a combination of trace gas permeable member 130 and bypass valve 160 may be connected to midstage line 142 (FIG. 2) of turbopump 120 or may be connected directly to inlet 162 of mass spectrometer 122.

Figure 5:
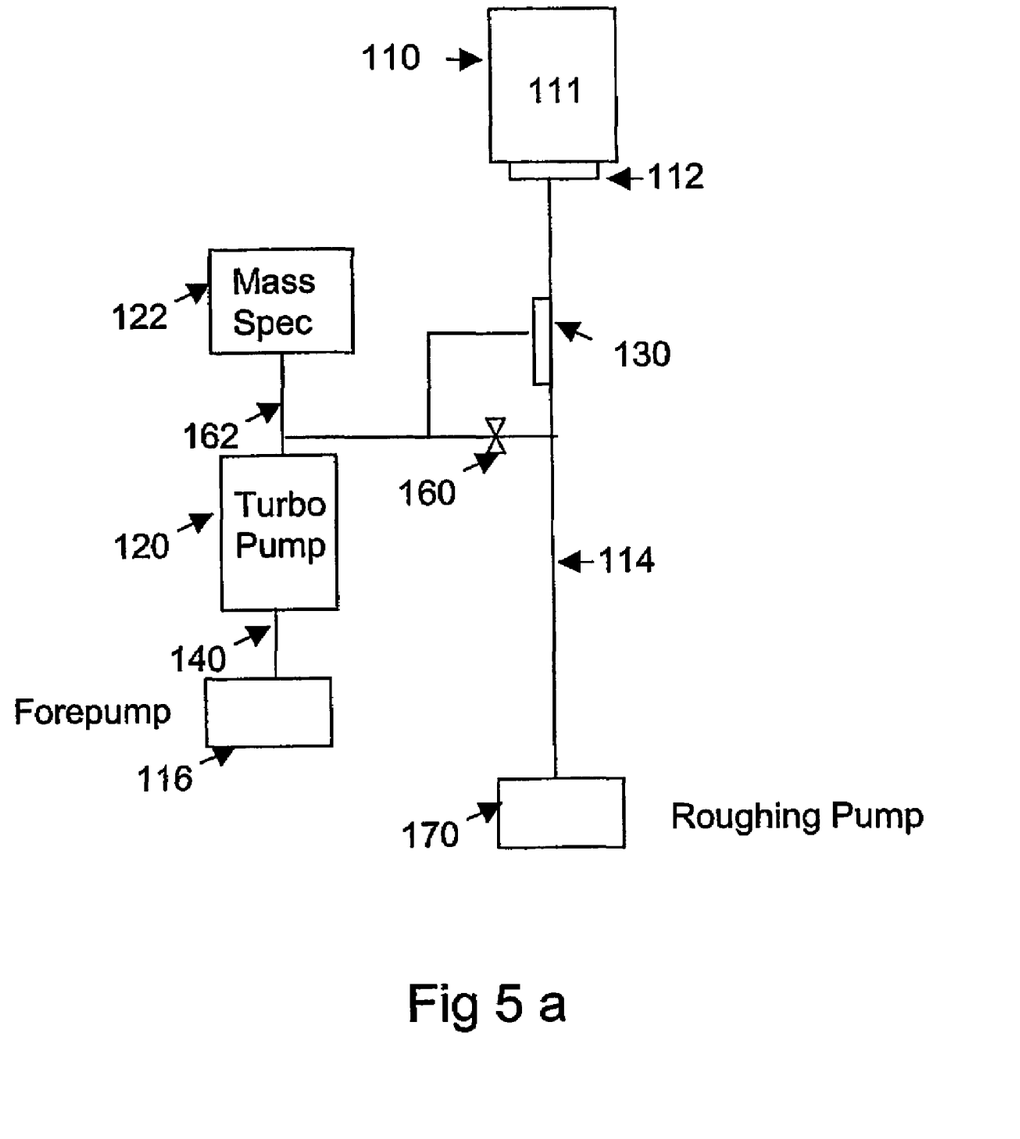
FIG. 5A is a simplified block diagram of apparatus for leak detection in accordance with a third embodiment of the invention.
FIG. 5B is a simplified block diagram of apparatus for leak detection in accordance with a fourth embodiment of the invention.
FIG. 5C is a simplified block diagram of apparatus for leak detection in accordance with a fifth embodiment of the invention.

Apparatus for leak detection in accordance with a third embodiment of the invention is shown in FIG. 5A. Like elements in FIGS. 2, 4 and 5A have the same reference numerals. In the embodiment of FIG. 5A, foreline 140 of turbopump 120 is connected to forepump 116, and test line 114 is connected to a separate roughing pump 170. Trace gas permeable member 130 is coupled between inlet 162 of mass spectrometer 122 and test line 114. Bypass valve 160 is coupled in parallel with permeable member 130.

Apparatus for leak detection in accordance with a fourth embodiment of the invention is shown in FIG. 5B. Like elements in FIGS. 2, 4, 5A and 5B have the same reference numerals. In the embodiment of FIG. 5B, trace gas permeable member 130 is coupled between test line 114 and foreline 140 of turbopump 120. Bypass valve 160 is coupled in parallel with permeable member 130.

Apparatus for leak detection in accordance with a fifth embodiment of the invention is shown in FIG. 5C. Like elements in FIGS. 2, 4, 5A and 5C have the same reference numerals. In the embodiment of FIG. 5C, trace gas permeable member 130 is coupled between test line 114 and midstage line 142 of turbopump 120. Bypass valve 160 is coupled in parallel with permeable member 130.

The foregoing embodiments illustrate that permeable member 130 may be utilized at different points in the leak detection apparatus to achieve different leak detection sensitivities. An optional bypass valve may be coupled in parallel with permeable member 130. The leak detection apparatus may utilize a single forepump or a forepump and a separate roughing pump. In further embodiments, permeable members may be utilized at more than one point in the leak detection apparatus.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. Apparatus for leak detection comprising:
   a test line configured to receive a sample containing a trace gas;

a mass spectrometer configured to detect the trace gas and having an inlet for receiving the trace gas;

a first vacuum pump characterized by a relatively high reverse flow rate for light gases and a relatively low reverse flow rate for heavy gases, said first vacuum pump having a pump inlet and a foreline, the pump inlet being coupled to the inlet of said mass spectrometer;

a foreline valve coupled between the foreline of said first vacuum pump and the test line;

a trace gas permeable member coupled between the test line and the inlet of said mass spectrometer, allowing the trace gas to pass and blocking other gases, liquids and particles;

a controller configured to increase the trace gas permeability of the permeable member by closing said foreline valve at relatively high pressures and decreasing the trace gas permeability of the permeable member by opening said foreline valve at relatively low pressures in the test line; and a second vacuum pump having an inlet coupled to the test line.

2. Apparatus as defined in claim 1, wherein the permeable member comprises a quartz member.

3. Apparatus as defined in claim 1, wherein the permeable member comprises a quartz member, the apparatus further comprising a heating element in thermal contact with the quartz member and the controller configured to control the heating element.

4. Apparatus as defined in claim 1, wherein the first vacuum pump comprises a turbomolecular pump.

5. Apparatus as defined in claim 1, wherein the first vacuum pump comprises a diffusion pump.

6. Apparatus as defined in claim 1, wherein the first vacuum pump comprises a hybrid vacuum pump including axial pumping stages and one or more molecular drag stages.

7. A method for leak detection, comprising:

pumping gas from a test volume through a test line;

at relatively high pressures in the test line, passing a first portion of the pumped gas through a trace gas permeable member to a mass spectrometer and controlling the permeable member between high trace gas permeability at relatively high pressures in the test line and low trace gas permeability at relatively low pressures in the test line, the trace gas permeable member allowing the trace gas to pass and blocking other gases, liquids and particles; and at relatively low pressures in the test line, passing a second portion of the pumped gas in reverse direction through a vacuum pump to the mass spectrometer, the vacuum pump characterized by a relatively high reverse flow rate for light gases and a relatively low reverse flow rate for heavy gases.

8. A method as defined in claim 7, wherein passing the second portion of the pumped gas in reverse direction through the vacuum pump comprises providing a foreline valve coupled between a foreline of the vacuum pump and the test line, closing the foreline valve at relatively high pressures in the test line and opening the foreline valve at relatively low pressures in the test line.

9. A method as defined in claim 7, wherein controlling the permeable member comprises heating the permeable member.

10. A method as defined in claim 7, further comprising detecting gas directed through the trace gas permeable member at relatively high pressures in the test line to identify a large leak.

11. A method as defined in claim 7, wherein passing the first portion of the pumped gas through the trace gas permeable member comprises increasing the permeability of the permeable member and closing a foreline valve coupled between a foreline of the vacuum pump and the test line, and wherein passing the second portion of the pumped gas in reverse direction through the vacuum pump comprises decreasing the permeability of the permeable member and opening the foreline valve.

12. Apparatus for leak detection comprising:

a test line configured to receive a sample containing a trace gas;

a mass spectrometer configured to detect the trace gas and having an inlet for receiving the trace gas;

a first vacuum pump characterized by a relatively high reverse flow rate for light gases and a relatively low reverse flow rate for heavy gases, said first vacuum pump having a pump inlet and a foreline, the pump inlet being coupled to the inlet of said mass spectrometer;

a second vacuum pump configured to back the first vacuum pump;

a trace gas permeable member coupled between the test line and the foreline, the trace gas permeable member allowing the trace gas to pass and blocking other gases, liquids and particles; and a controller configured to increase the trace gas permeability of the permeable member by closing a foreline valve at relatively high pressures and decreasing the trace gas permeability of the permeable member by opening said foreline valve at relatively low pressures in the test line.

13. Apparatus as defined in claim 12, wherein the first vacuum pump comprises a turbomolecular pump.

14. Apparatus as defined in claim 12, further comprising a bypass valve coupled in parallel with the trace gas permeable member.

15. Apparatus as defined in claim 12, further comprising a roughing pump coupled to the test line.

16. Apparatus for leak detection comprising:

a test line configured to receive a sample containing a trace gas;

a mass spectrometer configured to detect the trace gas and having an inlet for receiving the trace gas;

a turbomolecular vacuum pump having a pump inlet, a midstage line and a foreline, the pump inlet being coupled to the inlet of the mass spectrometer;

a forepump configured to back the turbomolecular vacuum pump; and a trace gas permeable member coupled between the test line and the midstage line of the turbomolecular vacuum pump, the trace gas permeable member allowing the trace gas to pass and blocking other gases, liquids and particles; and a controller configured to increase the trace gas permeability of the permeable member by closing a foreline valve at relatively high pressures and decreasing the trace gas permeability of the permeable member by opening said foreline valve at relatively low pressures in the test line.

17. Apparatus as defined in claim 16, further comprising a bypass valve coupled in parallel with the trace gas permeable member.

18. Apparatus as defined in claim 16, further comprising a roughing pump coupled to the test line.

* * * * *